United States Patent [19]

Fong et al.

[11] 4,385,099
[45] May 24, 1983

[54] METAL HALOGEN BATTERY CONSTRUCTION WITH IMPROVED TECHNIQUE FOR PRODUCING HALOGEN HYDRATE

[75] Inventors: Walter L. Fong, Royal Oak; Henry A. Catherino, Rochester; Richard J. Kotch, Mt. Clemens, all of Mich.

[73] Assignee: Energy Development Associates, Inc., Madison Heights, Mich.

[21] Appl. No.: 310,627

[22] Filed: Oct. 13, 1981

[51] Int. Cl.$^3$ ............................................. H01M 8/04
[52] U.S. Cl. ..................................... 429/15; 429/17; 429/19; 429/51; 429/67; 429/101
[58] Field of Search ...................... 429/15, 51, 17, 229, 429/199, 67, 70, 19, 20, 21, 101

[56] References Cited

U.S. PATENT DOCUMENTS

| | | | |
|---|---|---|---|
| 3,713,888 | 1/1973 | Symons | 136/6 |
| 3,993,502 | 11/1976 | Bjorkman, Jr. | 429/51 |
| 4,001,036 | 1/1977 | Berman et al. | 429/67 |
| 4,146,680 | 3/1979 | Carr et al. | 429/51 |

OTHER PUBLICATIONS

"Development of the Zinc-Chlorine Battery for Utility Applications", EM-1051, pp. 18-8, 18-9, Elec. Power Res. Inst., Apr. 1979.

*Primary Examiner*—Charles F. LeFevour
*Attorney, Agent, or Firm*—Harness, Dickey & Pierce

[57] ABSTRACT

An improved electrical energy storage system comprising, at least one cell having a positive electrode and a negative electrode separated by aqueous electrolyte, a store means wherein halogen hydrate is formed and stored as part of an aqueous material having a liquid level near the upper part of the store, means for circulating electrolyte through the cell, conduit means for transmitting halogen gas formed in the cell to a hydrate forming apparatus associated with the store, said hydrate forming apparatus including, a pump to which there is introduced quantities of the halogen gas and chilled water, said pump being located in the store and an outlet conduit leading from the pump and being substantially straight and generally vertically disposed and having an exit discharge into the gas space above the liquid level in the store, and wherein said hydrate forming apparatus is highly efficient and very resistant to plugging or jamming. The disclosure also relates to an improved method for producing chlorine hydrate in zinc chlorine batteries.

6 Claims, 1 Drawing Figure

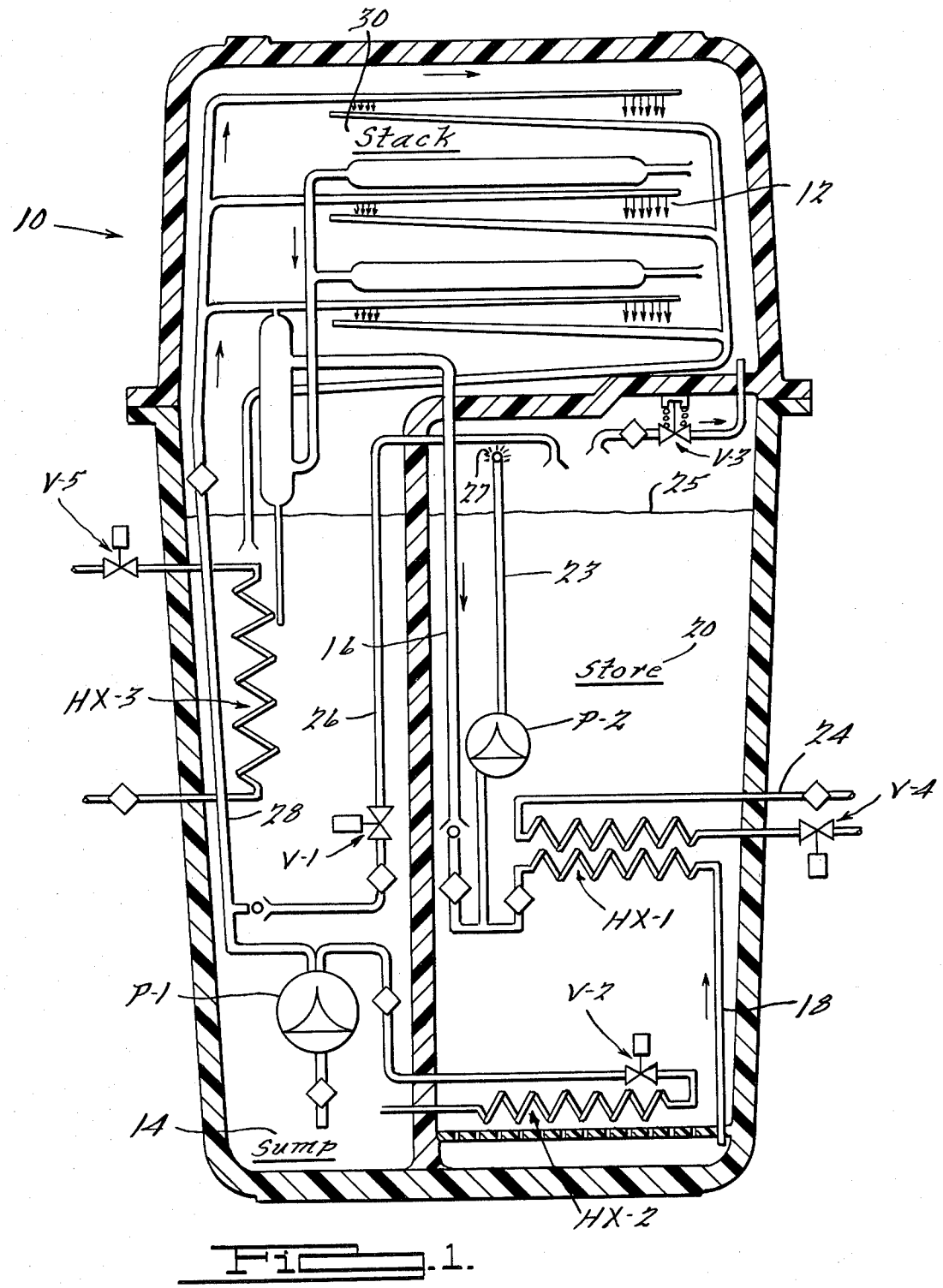

METAL HALOGEN BATTERY CONSTRUCTION WITH IMPROVED TECHNIQUE FOR PRODUCING HALOGEN HYDRATE

BACKGROUND OF THE INVENTION

The Government of the United States of America has rights in this invention pursuant to Contract No. DE-AC02-78ET26923 awarded by the U.S. Department of Energy.

The present invention relates to an improved electrical energy storage system, and more particularly the invention relates to an improved metal halogen battery system which includes an improved technique for producing chlorine hydrate.

The electrical energy storage system of the type referred to herein (for example a zinc-chlorine battery system) utilizes a halogen hydrate as the source of a halogen component for reduction at a normally positive electrode, and an oxidizable metal adapted to become oxidized at a normally negative electrode during the normal discharge of the storage system. An aqueous electrolyte is employed for replenishing the supply of the halogen component as it becomes reduced at the positive electrode. The electrolyte contains the dissolved ions of the oxidized metal and the reduced halogen and is circulated between the electrode area and a storage area containing halogen hydrate which progressively decomposes during a normal discharge of the electrical energy storage system, liberating additional elemental halogen to be consumed at the positive electrode. Electrical energy storage systems or battery systems of this type are described in prior patents owned by the same assignee as the present invention, such as U.S. Pat. Nos. 3,713,888, 3,993,502, 4,001,036, and 4,146,680. Such systems are also described in published reports prepared by the assignee herein, such as EPRI Report EM-1051 (Parts 1-3) dated April, 1979 (published by the Electric Power Research Institute). The specific teachings of the aforementioned U.S. Patents and the EPRI Report are incorporated herein by reference. Battery systems of the type referred to herein are frequently housed within modular containers, for example see Chapter 18 of the EPRI Report EM-1051 and page 18-8 of said report, which are incorporated herein by reference.

In the past, there have been significant difficulties and problems connected with the halogen hydrate formation system used in load leveling battery applications of the type referred to above. In prior battery systems of the load leveling type the hydrate formation system frequently encountered operating problems after several hours of operation of the system; and, such problems emanated from the hydrate formation system such that rather drastic operational measures were required. An exemplification of a prior technique for forming halogen hydrate in a load leveling battery, of the zinc chlorine battery type, is shown at page 18-8 of the EPRI Report EM-1051 referred to above. The problems involved in this prior technique of forming halogen hydrate were thought to have been caused by the halogen gas pump becoming plugged up or jammed with the hydrate material which was formed as a result of the reaction between the halogen gas and chilled water which are introduced to the gas pump. The precise cause of the plugging or jamming of the system was unknown.

Accordingly, a main object of the present invention is to provide an improved technique for producing chlorine hydrate in metal halogen battery systems.

Another object of the invention is to provide an improved metal halogen battery system which includes a special construction for the hydrate forming means utilized in the system.

Another object of the invention is to provide an improved method for producing chlorine hydrate in zinc chlorine battery systems.

Other objects, features and advantages of the present invention will become apparent from the subsequent description and the appended claims taken in conjunction with the accompanying drawings.

BRIEF DESCRIPTION OF THE DRAWINGS

FIG. 1 illustrates a schematic drawing of a zinc chlorine battery module which utilizes the improved technique for producing chlorine hydrate in accordance with the invention herein.

SUMMARY OF THE INVENTION

In briefly summarized form, the present invention comprises the introduction of halogen gas and chilled water to a specially oriented pump means wherein the outlet conduit from the pump is substantially straight and generally vertically disposed, and wherein the exit from the outlet conduit discharges into the gas space above the liquid level in the store of the battery. It has been discovered that this results in the halogen hydrate being formed in a highly efficient manner and without any plugging or jamming of the overall hydrate forming apparatus.

From an apparatus standpoint, the present invention concerns an electrical energy storage system, comprising the combination of, at least one cell having a positive electrode and a negative electrode separated by aqueous electrolyte containing the material of said metal and halogen, store means wherein halogen hydrate is formed and stored as part of an aqueous material having a liquid level at an upper part of the store means, means for circulating electrolyte through the cell, conduit means for transmitting halogen gas formed in the cell to a hydrate forming means associated with the store means, said hydrate forming means including, pump means to which there is introduced quantities of said halogen gas and relatively chilled water, said pump means being located in the store below the liquid level thereof, and preferably near the lower part of the store, outlet conduit means leading from said pump means and being substantially straight and generally vertically disposed and having an exit discharge into the gas space above the liquid level in said store means.

DESCRIPTION OF THE INVENTION

With reference to the drawing FIG. 1, there is shown a schematic of a zinc-chlorine battery module designated 10. In the operation of the battery 10 in a charge mode, means are provided to achieve the desired flows of chlorine, electrolyte, water and heat. The electrolyte pump designated P-1 delivers electrolyte to pockets between pairs of porous graphite chlorine electrodes as designated at 12. The electrolyte passes through the porous-chlorine electrodes, and eventually spills through high resistance cascades back into the sump designated 14. Chlorine gas is pumped by the second pump P-2 through the line 16. Before entering the pump P-2, the chlorine is mixed with chilled water, which passes through the line 18 and comes from the bottom of the store 20. The chlorine and chilled water are mixed in the gas pump P-2, chlorine hydrate is formed, and the chlorine hydrate-water mixture is deposited in the store through the special conduit 23. The water in line 18 is chilled by passage through a heat exchanger designated HX-1. Glycol cooled by means of a refrigeration system is passed through line 24 into the heat exchanger HX-1. Further heat exchangers are designated HX-2 for the decomposition heat exchanger, and HX-3 for the sump heat exchanger. The valves shown in the schematic of FIG. 1 are the charge/discharge valve V-1, the decomposition valve V-2, the pressure relief valve V-3, the chiller valve V-4, and the sump temperature control valve V-5.

In discharge, the valve designated V-2 is opened permitting a stream of warm electrolyte to pass through heat exchanger HX-2 in the store. Chlorine is formed by decomposition of chlorine hydrate in the store 20. When development of the required pressure in the store is reached, the valve V-1 in line 26 is opened and chlorine passes into line 28 on the high pressure side of the electrolyte pump P-1. The chlorine dissolves in the electrolyte, which is then fed to the porous graphite chlorine electrodes. The battery stack 30 can now be discharged, electro dissolution of zinc occurs at the zinc electrode, reduction of the dissolved chlorine occurs at the chlorine electrode, power is available at the battery terminals (not shown), and zinc chloride is formed in the electrolyte.

There is now to be described the novel technique for producing halogen hydrate as discovered and disclosed herein. In the prior technique, the hydrate formation system involved the mixing in a gear pump of chlorine gas from the battery gas space with continuously recirculated chilled liquid from the store, and the mixture was then passed through a coiled tube of sufficient length to allow a residence time of a few seconds at substantially above hydrate equilibrium pressure to maximize the hydrate formation, and the hydrate formed was exited from the coiled tube below the liquid level of the store.

As previously mentioned, this prior technique of hydrate formation led to significant problems in that plugging and jamming in the hydrate forming apparatus occurred after just a few hours of operation. It is to be noted that in accordance with the technique disclosed in the invention discovered and disclosed herein, the outlet conduit 23 from the pump P-2 is disposed upwardly in a substantially vertical orientation and the outlet tube 23 passes in a straight through fashion to a point above the liquid level 25 of the store 20 with the outlet from the tube 23 exiting into the gas space above the store liquid level as designated at element 27. Surprisingly, this apparatus as disclosed herein for carrying out the hydrate formation has been found to give unexpectedly good results in terms of hydrate formation without any plugging or jamming of the hydrate forming apparatus as has previously been encountered in the prior techniques. The prior coiled tube concept was considered necessary at least in part to provide necessary residence time for the reaction, however it was unsatisfactory and nonfunctional after limited operating time, whereas the construction as shown in FIG. 1 has been found to give excellent results. The concept disclosed herein has been found to be extremely satisfactory under load leveling operational specifications for zinc chlorine battery modules, however, it is also considered that it would be effective in batteries designed for mobile applications. While the theory underlying the invention is not completely understood, it is believed that the reason for the uniquely improved performance in terms of the hydrate formation apparatus as disclosed herein, lies in the concept that the previous plugging problems or jamming problems were caused by gas bubbles that formed a growth or coating of hydrate around them in the prior technique of hydrate forming. Those bubbles tended to agglomerate into large solid masses wherever they collected, whereas in the improved apparatus as disclosed herein, the formation of such gas bubbles is avoided by reducing the pressure drop in the outlet tube 23 so as not to enhance the rate of hydrate formation in the region of the outlet tube near the pump and the vertical orientation of the outlet tube 23 allows the gas bubbles to rise rather than collect under inside surfaces within a tube such as of the coil type which was previously used. Furthermore, by exhausting the discharge from the outlet tube 23 into the gas space above the liquid level 25 in the store, no encrustation results in the tube outlet, whereas this encrustation was observed whenever the tube was submerged underneath the liquid level of the store as was previously done in prior hydrate forming apparatuses.

The following are the operating conditions under which hydrate is formed when using the method of hydrate formation as discovered and disclosed herein:
Chlorine flow rate into store 1.46 moles/min
Chilled water flow rate 11.5 l/min
Temperature of chilled water 7.9° C.
Inlet pump pressure −2 to −5 psig
Outlet pump pressure 8 to 11 psig
Store gas space pressure 7 to 9 psig
Operating time 6.6 hours
Quantity of water in store 409 liters
Average hydrate storage density when charged 0.1 g $Cl_2$/ml As described hereinabove, the outlet tube 23 should be generally oriented vertically from the outlet of the pump P-2. Although this is the preferred orientation the tube has been found to function in other pump orientations by using elbows in the plumbing of the hydrate forming apparatus. In the latter case, however, care should be exercised to insure that turbulence is maximized in the elbows and that no quiescent regions are created. As a further exemplification of the invention herein, the inside diameter of the outlet conduit or pipe 23 found suitable for operation was ⅝ths inches. Larger diameters up to 5–6 inches should operate equally as well. Smaller inside diameters may cause an increased probability for plug formation or jamming of the outlet tube. In smooth tubes, it would not be unreasonable to expect reasonable and good performance in tubes having a ½ inch inside diameter. However, the invention described should not be unreasonably limited by the dimensions given. The invention as described herein has been used regularly in numerous load leveling modules in the assignee's plant and has been found to perform in an extremely satisfactory manner without any of the problems and difficulties which were previously encountered in prior hydrate formation systems.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an electrical energy storage system, the combination of,
   at least one cell having a positive electrode and a negative electrode separated by aqueous electrolyte containing the material of said metal and halogen,
   store means wherein halogen hydrate is formed and stored as part of an aqueous material having a liquid level at an upper part of the store means,
   means for circulating electrolyte through the cell,
   conduit means for transmitting halogen gas formed in the cell to a hydrate forming means associated with the store means,
   said hydrate forming means including,
       pump means to which there is introduced quantities of said halogen gas and relatively chilled water which subsequently react to form halogen hydrate, said pump means being located in the store means,
       outlet conduit means leading from said pump means and being substantially straight and generally vertically disposed and having an exit discharge into the gas space above the liquid level in said store means.

2. The electrical energy storage system as defined in claim 1 wherein,
   said system is of the zinc-chlorine battery type, and said outlet conduit means contains a negligible amount, if any, of bent portions therein.

3. The electrical energy storage system as defined in claim 1 wherein,
   said outlet conduit means is made of a tough durable material which is resistant to corrosion from the aqueous material in the store and the halogen gas, and
   said outlet conduit means containing a negligible amount, if any, of bent portions therein.

4. The electrical energy storage system as defined in claim 1 wherein,
   said combination also includes sump means for collecting the electrolyte.

5. An improved method for producing halogen hydrate in a metal halogen electrical energy storage system, said system being comprised of,
   at least one cell having a positive electrode and a negative electrode separated by aqueous electrolyte containing the material of said metal and halogen,
   store means wherein halogen hydrate is formed and stored as part of an aqueous material having a liquid level at an upper part of the store means,
   means for circulating electrolyte through the cell,
   conduit means for transmitting halogen gas formed in the
   cell to a hydrate forming means associated with the store means,
   said hydrate forming means including,
       pump means to which there is introduced quantities of said halogen gas and relatively chilled water, said pump means being located in the store means below the liquid level thereof,
       outlet conduit means leading from said pump means and being substantially straight and generally vertically disposed and having an exit discharge into the gas space above the liquid level in said store means,
   said method comprising the steps of,
       introducing halogen gas and chilled water to said pump means to thereby initiate a reaction whereby halogen hydrate is formed during passage through the pump means and the outlet conduit means,
       recovering the halogen hydrate from the exit discharge and storing same in said store means.

6. The method of claim 5 wherein,
   said system is a zinc chlorine battery system, and the halogen hydrate formed is chlorine hydrate.

* * * * *